(12) United States Patent
Heim et al.

(10) Patent No.: US 8,363,140 B2
(45) Date of Patent: Jan. 29, 2013

(54) VISION SENSOR FOR MEASURING CONTRASTS AND METHOD FOR MAKING SUCH MEASURE

(75) Inventors: Pascal Heim, Saint-Aubin (CH); Pierre-Francois Ruedi, Marin-Epagnier (CH)

(73) Assignee: CSEM Centre Suisse d'Electronique et de Microtechnique SA Recherche et Developpement, Neuchatel (CH)

( * ) Notice: Subject to any disclaimer, the term of this patent is extended or adjusted under 35 U.S.C. 154(b) by 305 days.

(21) Appl. No.: 12/673,609

(22) PCT Filed: Feb. 19, 2009

(86) PCT No.: PCT/EP2009/051950
§ 371 (c)(1),
(2), (4) Date: Feb. 16, 2010

(87) PCT Pub. No.: WO2009/103751
PCT Pub. Date: Aug. 27, 2009

(65) Prior Publication Data
US 2011/0007199 A1 Jan. 13, 2011

(30) Foreign Application Priority Data
Feb. 22, 2008 (EP) .................................. 08151781

(51) Int. Cl.
*H04N 3/14* (2006.01)
*H04N 5/335* (2011.01)
(52) U.S. Cl. ................................. 348/308; 250/208.1
(58) Field of Classification Search ............. 348/207.99, 348/294, 300, 302, 308; 396/229; 250/208.1; 341/155
See application file for complete search history.

(56) References Cited

U.S. PATENT DOCUMENTS

| 4,797,562 | A | 1/1989 | Dietrich |
| 5,376,992 | A * | 12/1994 | Hasegawa et al. ............. 396/229 |
| 5,801,657 | A * | 9/1998 | Fowler et al. ................. 341/155 |
| 6,580,454 | B1 * | 6/2003 | Perner et al. .................. 348/302 |
| 2003/0107666 | A1 | 6/2003 | Harton et al. |
| 2006/0011806 | A1 * | 1/2006 | Heim et al. ................. 250/208.1 |

FOREIGN PATENT DOCUMENTS

| EP | 1301028 | 4/2003 |
| EP | 1858245 | 11/2007 |
| GB | 2432065 | 5/2007 |

OTHER PUBLICATIONS

International Search Report of PCT/EP2009/051950, mailed on Jun. 9, 2009.
P.-F. Rüedi et al.: "A 128×128 Pixel 120-dB Dynamic-Range Vision-Sensor Chip for Image Contrast and Orientation Extraction", IEEE JSSC, vol. 38, No. 12, Dec. 2003.

* cited by examiner

*Primary Examiner* — Nelson D. Hernández Hernández
*Assistant Examiner* — Dennis Hogue
(74) *Attorney, Agent, or Firm* — Young & Thompson (57) ABSTRACT

A digital vision sensor includes a pixel array (10) for receiving a light beam representing a visual scene. The sensor includes: a reference voltage $V_{ref}$ generator; in each pixel, an element for generating, during an integration phase, a voltage $V_p$ that is proportional to the received lighting and a comparator (30) for determining the moment when the voltage $V_p$ thereof reaches the reference voltage; a logarithmic period generator for generating a clock having a period that increases proportionally to the time elapsed from the beginning of the integration; a device for counting the number of clock periods elapsed from the beginning of the integration and providing a result in the form of a binary code; a static RAM memory word (50) per pixel; and, in each pixel, an element (40) for writing the code present at the moment into the memory.

8 Claims, 5 Drawing Sheets

VISION SENSOR FOR MEASURING CONTRASTS AND METHOD FOR MAKING SUCH MEASURE

TECHNICAL FIELD

The present invention relates to vision sensors made on a single chip. It more particularly relates to a viewing sensor which, for each pixel, converts and digitally stores in memory a measurement of the light intensity emitted by a scene and received by the sensor, such a measurement being subsequently intended to be used for computing an invariant of the scene such as a contrast value relative to neighboring pixels. The invention also relates to the method for conducting this measurement.

STATE OF THE ART

Such devices use a concept called "Time-to-Vref" which consists of measuring the time which the voltage resulting from the integration of a photo-current on a capacitance takes for reaching a threshold set a priori and called $V_{ref}$. This allows operation over a very large dynamic range of light illumination. In most applications, this threshold is the same for the whole of the imager, but it may easily be devised that it may vary from one region of interest to another. Moreover, the implementation may vary from one example to the other, by including a counter internal to the pixel which stops when the threshold is reached or further an external counter which more conventionally will store in memory the value of the comparison between the voltage of the pixel and the threshold voltage. Another implementation is described in the European patent application EP 1301028 where a Gray counter is used to store a Gray code in memory. A detector emits a signal when the comparison is reached. An example of a "Time-to-Vref" technique, applied to an image sensor may be found in the American patent U.S. Pat. No. 4,797,562 of Klaus Dietrich, entitled "Image Recording Sensor". Document US 2003/0107666 also uses this time measuring principle in an image sensor. Such sensors have the drawback of having a low dynamic range. In fact, it is necessary to dimension the integrator of the photo-current in order to avoid any saturation when the illumination to be measured is significant. During low illumination, the sensitivity of these sensors will be low.

A solution for improving this dynamic range is disclosed in document GB 2 432 065. It consists of providing a logarithmic value of the output quantity of the sensor. However, the making of this sensor requires essentially analog components, making it particularly sensitive to noise and it is complex to implement under real conditions.

Local computation of the contrast, whether this be its intensity or its orientation, had hitherto been performed by means of an analog multiplier (P.-F. Rüedi et al.: "A 128×128 Pixel 120-dB Dynamic-Range Vision-Sensor Chip for Image Contrast and Orientation Extraction", IEEE JSSC, Vol. 38, No. 12, December 2003). In the aforementioned document, the computation is carried out in an analog way and in first approximation, with an accuracy independent of the light illumination level of the scene and this, by means of the aforementioned time integration mode. Such a solution is interesting, notably because with it, less computations may be performed and it is less avid in terms of storage capacity. Nevertheless, the resolution of the sensor is lower with respect to other sensors from the state of the art implementing traditional methods. Further, as the implemented components are essentially analog, the aforementioned drawbacks also apply to this sensor.

DISCLOSURE OF THE INVENTION

In the field of standard imagers, the dynamic sensitivity range is one of the most important performance criteria. It may be defined as the ratio between the strongest luminance and the lowest luminance that the imager is capable of measuring and of restoring in an acceptable way.

A first object of the invention is to carry out shooting of an image with a large dynamic range in which the reflectance (or other parameter) of a same object illuminated with any light intensity is quantified with a resolution which does not depend on said light intensity.

Reflectance is a quantity which expresses the capability of components of a scene of re-emitting light.

In the following of the description, focus will be on measuring the contrast but other invariants may be applied. By contrast is meant the luminance ratio between two pixels or pixel areas, and by local contrast is meant the luminance ratio between neighboring or close pixels.

More specifically, the invention relates to a digital vision sensor which includes an array of pixels each having a photodetector and intended to receive a light beam representing a visual scene. In order to facilitate the measurement of at least one invariant of the scene, in the sense that it does not depend on the light illumination of the sensed scene, the sensor generates a value which only depends on the illumination of the scene to within a constant. The invariant may then be computed, by the sensor or outside the sensor, by simply subtracting these values. These values may be grouped before their subtraction. The sensor according to the invention includes:
  a reference voltage $V_{ref}$ generator,
  means in each pixel for generating during an integration phase, a voltage $V_P$ proportional to the illumination received by the pixel,
  in each pixel, a comparator for determining the instant at which the voltage $V_P$ of said pixel reaches the voltage $V_{ref}$, said voltage $V_{ref}$ being common to all the pixels,
  a device for measuring the elapsed time from the beginning of each integration,
  means for quantifying the time measured by said time measurement device with a time interval between two successive time values which increases in proportion with the elapsed time from the beginning of the integration. The variation of said interval forming a logarithmic compression of the illumination,
  a device with which said successive time values may be encoded in a binary code,
  one word of RAM static memory per pixel,
  in each pixel, means allowing said code present at said instant to be written into said memory,
  means for controlling the termination of the integration phase, and
  means for reading the information stored in memory.

Advantageously, the sensor according to the invention further comprises a device with which said binary value may be encoded in a Gray code and said reading means perform decoding of theses Gray codes into their original binary values.

Moreover, the sensor includes means for computing the contrast from the binary values stored in memory.

It is understood that the light illumination of each pixel is representative of the luminance of the part of the scene projected on this pixel, as this is the case in all the sensors of the state of the art. Because of the logarithmic nature of the integration time measurement, the logarithm of the luminance is obtained by simply changing the sign of this measurement.

When the light illumination of a part of the scene increases or decreases in a uniform way, for example when a large cloud passes in front of the sun, the area formed by the pixels which represent this part of the scene are invariant to light illumination to within a constant. In other words, the passing of the cloud will add (or subtract) the same value of a pixel of this area, to (from) all the pixels of this area. The result is that the contrast which is obtained by subtracting from the value of a pixel of this area, another pixel of the same area, is the same before and after the passing of the cloud. This is also true if the subtraction of groups of pixels is considered always in the same area. It is possible to add the value of the pixels of a group of pixels and to subtract it from the sum of the values of another group of pixels of same size. The result will also be invariant to light illumination. In the remainder of this document, when the fact is mentioned that the value of the contrast does not depend on illumination, or when it is mentioned that the value of the pixels only depends on illumination to within a constant, it is always understood that reference is made to the parts of the scene and by extension to the areas of the image, the illumination of which has varied in an uniform way between two shots, i.e. the illumination of which has been multiplied by a constant factor in a same area. This last condition does not presuppose that the illumination is uniform in the area, it is only the variation which should be uniform. It is also possible that this area represents the image in its entirety.

Figure 1:
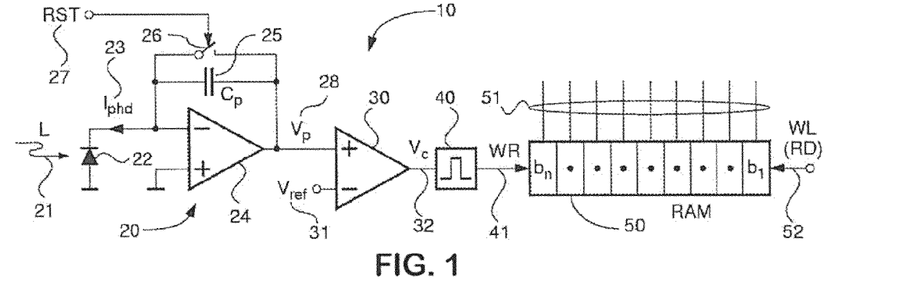
FIG. 1 illustrates the block diagram of a pixel.

The invention uses a method which measures the time taken by the voltage $V_P$ 28 of a pixel 10, resulting from the integration of the photo-current $I_{phd}$ 23 from its photodiode 22 on a capacitor $C_p$ 25, in order to reach a reference voltage $V_{ref}$31. Measurement of this time is quantified with a variable period, which increases in proportion with the elapsed time from the beginning of the integration, so that in addition to the aforementioned property, implicit logarithmic compression of the luminance allows subsequent computation of the data of the contrast, which only depends on the reflectance of the illuminated scene, hence the designation as vision sensor, used for the contrast measurement. Further, because of the logarithmic compression, it is possible to content oneself with less bits for a large dynamic range (10 bits for 6 decades). Among the other advantages, mention may be made without any order: better robustness, larger compactness (due to the reduced number of bits), greater simplicity in the computations of the contrast, higher performance due to the invariance of the effect of errors in pairing the components with respect to the illumination of the pixels and a quantification of this illumination which allows computation of the invariants with an accuracy which does not depend on the light illumination level of the sensed scene. It should be noted that a variation of the light illumination of the scene adds a same constant to the value of the pixels of the whole sensor.

SHORT DESCRIPTION OF THE DRAWINGS

Other details will more clearly apparent upon reading the description hereafter, made with reference to the appended drawing, wherein.

EMBODIMENT(S) OF THE INVENTION

The diagram of FIG. 1 only illustrates a possible implementation in CMOS type technology, but it is obvious that other implementations allow the same functions to be solved. An integrator 20, the positive input of which is connected to the ground, is connected through its other input to a photodiode 22, which generates a current $I_{phd}$ 23 when it receives light L 21. The integrator 20 uses a high gain amplifier 24 (preferably with a gain greater than 100). The integration capacitor $C_p$ 25 connected between the negative input and the output of the amplifier 24, is used for converting the photocurrent $I_{phd}$ 23 of the photodiode into a voltage $V_p$ 28 according to the relationship:

$$V_P = \frac{1}{C_P} \int_t I_{phd} dt \qquad (1)$$

The integration capacitance 25 may be reset to zero by means of the switch 26, itself controlled by a zero-resetting signal RST 27 delivered by a controller (not shown) of the vision sensor. The voltage $V_p$ 28 is compared with the reference voltage $V_{ref}$31, generally identical for the whole matrix, by the comparator 30, the output $V_c$ 32 of which is applied to the generator 40 of a write pulse WR41, itself applied to a RAM static memory 50. In this implementation, the voltage $V_C$ switches to the high state when the voltage of the pixel $V_P$ reaches the reference voltage $V_{ref}$.

An implementation of the pulse generator 40, which is active when it is in the high state, as well as of the RAM static memory 50 which is associated with it, is described in connection with FIG. 2. A RAM memory word per pixel for example comprises n bits, $b_1$-$b_n$. A bus 51, common to the whole column of pixels in the matrix, consists of n access lines, called bit lines. Reference 52 designates a WL (word line) signal or an RD (read) signal for reading the static memory 50. This signal is also used for resetting to zero all the memory cells before any new shot, as this will appear when describing FIG. 3.

Figure 2:
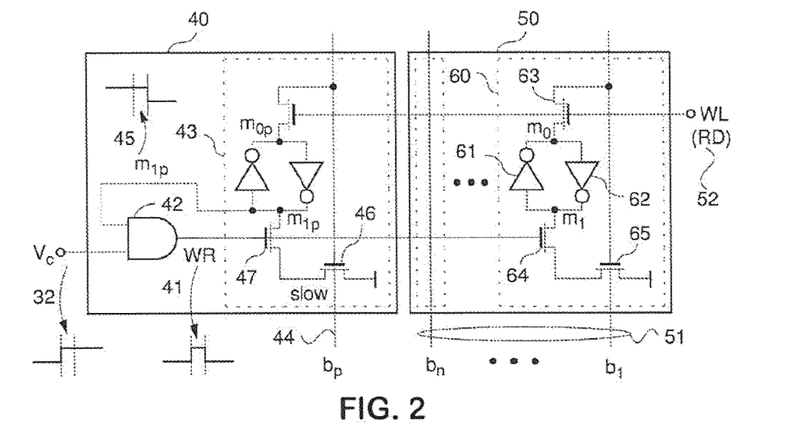
FIG. 2 shows the implementation of the RAM and of the generator of write pulses.

FIG. 2 illustrates an implementation of the RAM 50 and of the write-pulse generator 40. One RAM bit comprises two CMOS inverters 61 and 62, mounted head to foot and intended to be used as a latch at the memory cell 60. The transistor 63 is the transistor for accessing the cell both when reading and writing. Writing only allows placement of a zero on node $m_0$. For this, the bit line $b_i$ is maintained to zero while a write pulse in the high state is applied on the control line WL 52. The node $m_0$ is then pulled to the low voltage imposed on the bit line by the transistor 63. Reading of the node $m_0$ after acquiring the image is also performed by means of a pulse in the high state on the control line WL 52. The transistor 63 then applies on the bit line $b_j$ the voltage on the node $m_0$ imposed by the inverter 61. The transistor 64 is the transistor for writing into the memory 60 from the inside of the pixel 10 (see FIG. 1). After resetting to zero the memories, all the nodes $m_1$ are in the high state and all the nodes $m_0$ are in the low state. The memories therefore contain zeroes. When the pixel produces a write pulse WR 41, making the transistor 64 conducting will conditionally pull the $m_1$ node to the low state depending on the state present on the bit line of the memory. If this bit line is in the low state, the transistor 65, which is the transistor for writing into the memory 60, controlled by the datum present on the bit line, is blocked (i.e. non-conducting) and the $m_1$ node remains in the high state (the memory retains its zero state). On the other hand if the bit line is in the high state, simultaneous conduction of transistors 64 and 65 during the pulse WR 41 will pull the $m_1$ node to the low state, which corresponds to writing a "1" into the memory. The transistor 65 for writing into the memory 60 is actually controlled by the datum present on the bit line.

The generator 40 of the pulse WR 41 for writing into the memory 50 consists of a memory 43 and of a logic AND gate 42. The memory cell 43 is set to zero before sensing an image, generally at the same time as the memory word 50. In this state, its internal node $m_1$, represented by the signal $m_{1p}$ 45 and the output of the AND gate 42 assumes the same state as its input connected to the output $V_c$ 32 of the comparator 30. From the beginning and during the whole sensing of the image, the bit line $b_p$ 44 is maintained in the high state, so as to make transistor 46 conducting. When the output $V_c$ 32 of the comparator 30 switches to the high state, i.e. when $V_p$ 28 reaches $V_{ref}$ 31, the signal WR 41 switches to the high state which makes transistor 47 conducting, and then causes the signal $m_{1p}$ to switch to the low state in order to finally terminate the pulse WR 41 by blocking the AND gate 42.

The duration of the WR 41 pulse depends on the switching rate of the two inverters 61 and 62 and on the transmission delay of the AND gate 42. In order to be sure that the duration of this pulse is sufficient for switching all the cells of the memory word 50, the length of the transistor 46 is larger than that of the transistor 65 of the cells of the memory word 50, so that the switching time of the cell 43 is shorter than that of the other cells in the worst case. As indicated earlier, the write pulse of the memory 50 is active in the high state. The memory cell 43 is used for generating the write pulse WR 41 of the memory 50. The bit line $b_p$ 44 is associated with the memory cell 43. The signal $m_{1p}$ 45 from the memory 43 is used, as indicated above, for generating the write pulse. The transistor 46, controlled by the datum present on the bit line $b_p$ 44 is longer than its equivalent 65 of the cells of the memory word 50.

Figure 3:
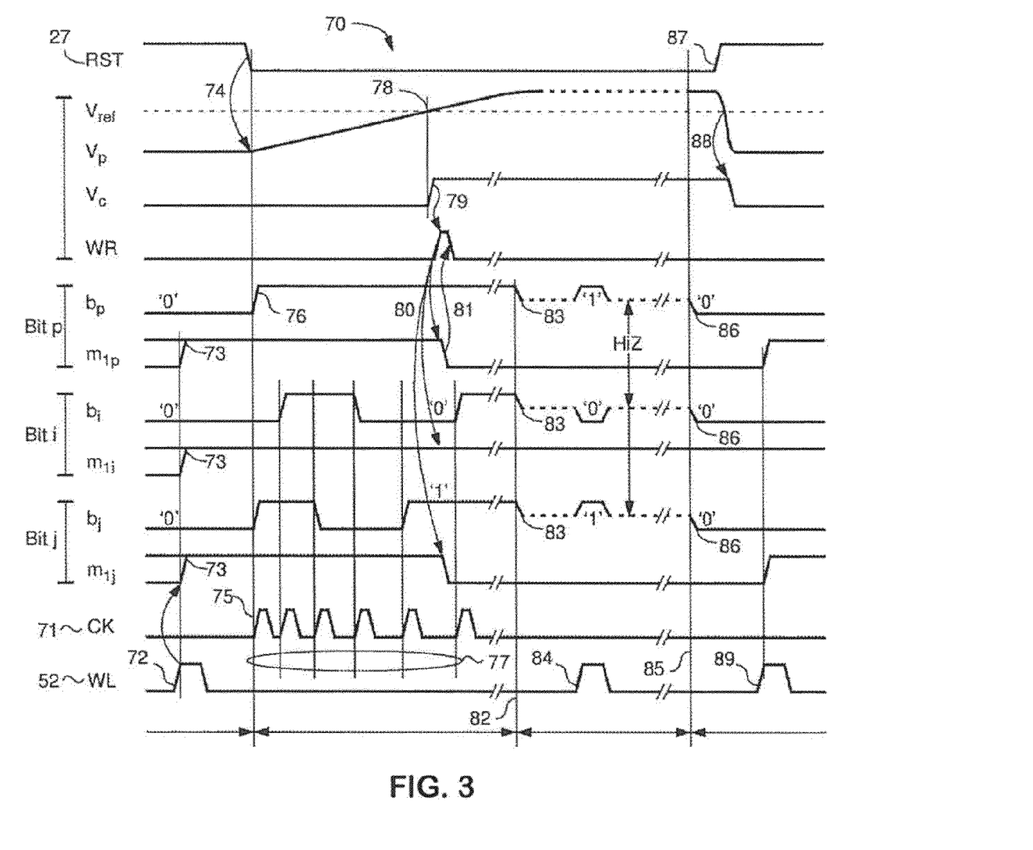
FIG. 3 illustrates a time diagram for acquiring an image.

FIG. 3 shows in 70 a time diagram which corresponds to a complete although simplified cycle for acquiring an image.

Reference CK 71 illustrates the clock of the system, called a clock with logarithm time because the time which separates two successive pulses varies, as this will be explained in connection with FIG. 5, with the time having elapsed from the beginning of the exposure time 75 and therefore from the beginning of the integration.

Before starting the acquisition of an image, a pulse 72 on the signal WL 52 resets all the RAM cells to zero, including the cells of the memory word 50, as well as the cell 43 associated with the pulse generator 40. This pulse on the signal WL 52 forces the writing of a zero in all the cells, all the bit lines having been kept beforehand in the low state. Reference 73 shows the effect of the resetting to zero of all the memory cells. The nodes $m_0$, not shown, are pulled to the low state, while the nodes $m_1$ are pulled to the high state.

Reference 74 shows the opening of the switch 26 for resetting to zero (RST) the pixels, which marks the beginning of the integration 75 of the photo-currents 23 on the integration capacitors $C_P$ 25.

The integration period and the generation of the clock with logarithmic time therefore start at the same time. In 76, the bit line $b_P$ switches to the high state in order to allow writing into the memory cell 43 during the switching of the comparator 30.

Reference 77 designates the different instants defined by the clock with logarithmic time. The voltage of the pixel $V_P$ 28 reaches the reference voltage $V_{ref}$ 31 at instant 78. In 79, the output $V_c$ 32 of the comparator 30 switches to the high state following the event 78, which causes switching to the high state of the write signal WR 41 internal to the pixel 10. In 80, the high state is written into the memory bits, for which the bit lines are in the high state, while the other bits are maintained in the low state. In 81, writing the high state bit p pulls the node $m_{1p}$ down to the low state, which has the effect of terminating the write pulse WR 41 following blocking of the AND gate 42.

Figure 5:
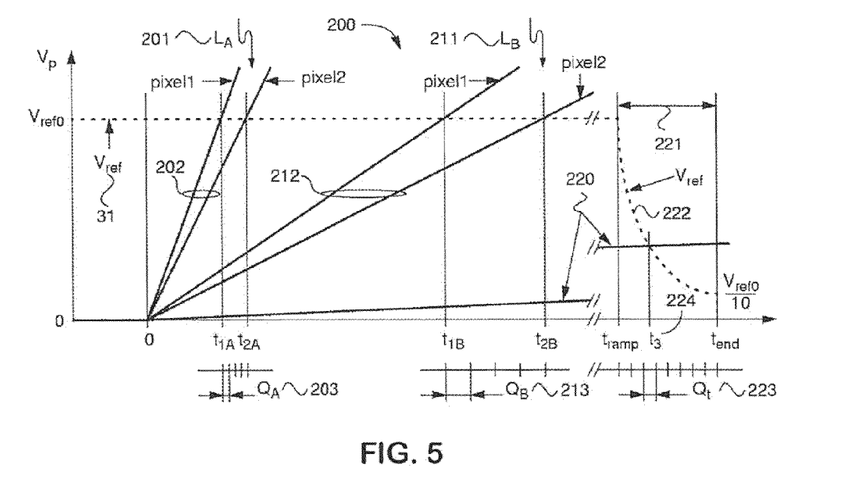
FIG. 5 shows the principle of homothetic sampling.

Reference 82 corresponds to the end of the integration on which we will come back in connection with FIG. 5;

Reference 83 designates the beginning of the phase for reading the memory at which the bit lines 51 and 44 are set to a read mode, i.e. in a high impedance HiZ state. According to the implementation of the read amplifiers and to the dimensioning of the memory cells 60, the bit lines 51 and 44 may be preloaded with the high state. In 84, the write pulse is applied onto one of the word lines of the matrix (signal WL 52). The transistors 63 of the cells 60 will pull the corresponding bit lines up to the high state or down to the low state depending on the voltages on the nodes $m_0$ of these cells. Reading of the bit lines will be performed by the read/write block 140 (FIG. 4) which contains the read amplifiers and then the cycle starts again for the whole or part (area of interest) of the lines of the pixel matrix 101). Reference 85 designates the end of the reading period of the matrix. In 86, the bit lines 51 and 44 are activated to the low state in expectation of the zero-resetting phase of the amplifiers 20 and of the memory cells 60 and 43 of the pixels 10.

In 87, the integrators 20 of the pixels 10 are reset to zero. Following this action, the output $V_P$ 28 and then the output $V_c$ 32 of the integrators switch to the low state in 88.

In 89, the write pulses for resetting to zero memory cells 60 and 43 occur by means of the line selection signal WL 52. When this signal is applied in the high state, at the same time as the bit lines 51 and 41 are maintained in the low state with low impedance, the nodes $m_0$ of the memory cells 63 and 43 are forced into the low state, which corresponds to a zero. It should be noted that resetting to zero of the memories through this means may be accomplished sequentially line by line, since the buffers which activate the bit lines 51 and 44 may not be reasonably dimensioned for allowing the switching of a whole column of memory cells.

Figure 4:
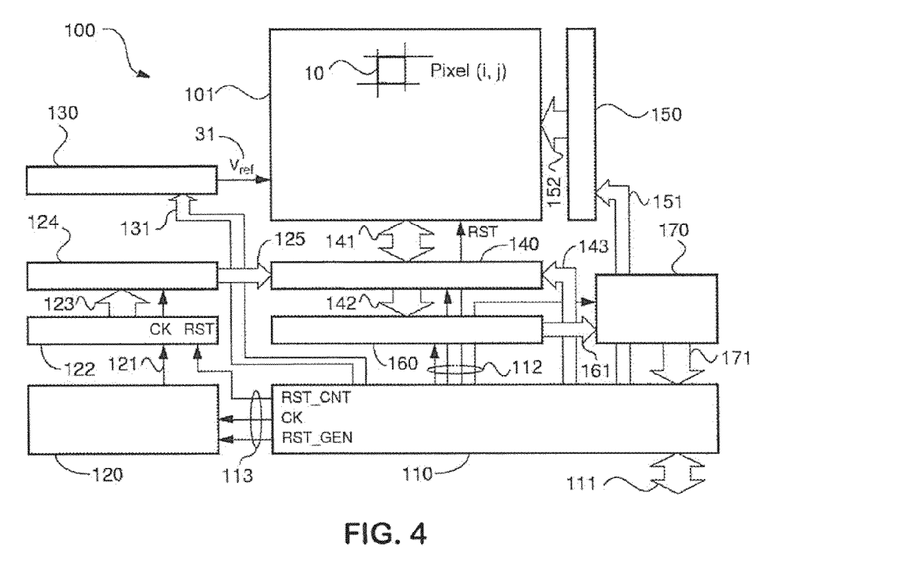
FIG. 4 is a block diagram.

FIG. 4 is a block diagram of the vision sensor 100 for measuring contrast. The system described here is a preferential version but is capable of having alternatives without departing from the scope of the invention. The matrix 101 comprises N lines and M columns of pixels. The block 110 ensures control of the complete circuit. It has an interface circuit 111 with the outside, for example a microcontroller, it handles the control signals 112 for reading/writing into the memory 140, registers for reading lines of pixels 160 and the block for computing contrasts 170. Finally, it generates control signals 113 for generating the clock with an exponential period. The signal RST_GEN is the signal for resetting to zero the logarithmic period generator 120. CK is a fixed frequency clock and RST_CNT is the signal for resetting to zero the time counter 122 for the homothetic sampling of the output of the pixels. The clock 121 of the generator 120 is used for incrementing the time counter 122. The n bit binary code 123 delivered by the counter 122 is converted in 124 into a Gray code 125 which is a code for which only one bit changes at a given instant. The conversion should be synchronized with the updating of the counter 122 in order to avoid invalid transitions. This implementation is not the only one possible; it has however been preferred because it provides simplification upon writing into the memory and thereby reduction of the number of transistors in the pixel. Indeed, without any Gray code, writing into the memory has to be prevented during the changing of code, which requires additional means in the pixel. The use of this code in such an analog-digital conversion comes under the well established state of the art. The n bit Gray code 125 is distributed, via the read/write control block 140, to the bit lines 51 of the M columns of pixels of the matrix 101. The digital/analog converter 130 generates the reference voltage $V_{ref}$. The digital code 131 provided by the control block 110 allows this reference voltage to be generated for the global measurement of the integration time in each pixel 10. It is when the voltage $V_P$ of the pixel reaches the reference voltage that the Gray code 125, present on the bit lines 51, is stored into the RAM memory word 50 of the pixel.

In the writing mode, the Gray code appears simultaneously on the bit lines 51 of the M columns of the matrix 101 represented by the data bus 141. In the reading mode, the data of the $k^{th}$ line of pixels, selected by the line decoding block 150, appear on the data bus 141 in order to be read and converted into binary by the block 140 and transferred into the read registers 160. The bus 142 is a unidirectional bus of same size as the bus 141 and enables transfer of data from the read/write block 140 to the read registers 160. The block control signals 140 and stemming from the control block of the circuit bear reference 143. The line address decoder 150 sends a line address 151 of the matrix 101 via the line selection bus 152. The buffer registers 160 for example contain the three last lines which were read, which allows the contrast computing circuit 170 to operate on the areas of 3×3 pixels. Reference 161 designates the bus for transmitting these areas towards the contrast computing circuit 170. The output 171 of the result of this computation is finally applied to the control block of the circuit 110. The method for computing the contrasts will be explained later on.

FIG. 5 shows in 200 the change over time of the voltages $V_P$ of two pixels referenced as "pixel 1" and "pixel 2". $L_A$ and $L_B$ designate the luminance illuminating one or more objects, for which $R_1$ and $R_2$ are the reflectances in two points of this object or these objects, measured by the pixels 1 and 2, respectively.

The reflectance of an object is the proportion of incident light intensity reflected by the object. It depends on the wavelength, but does not depend on the intensity of the light. Consequently, if the same object is illuminated with two different light intensities, with for example $L_A > L_B$, the measurement of the light intensity reflected by this object by the method for measuring the integration time of the photo-current will then provide integration times inversely proportional to the light intensity. For pixel n under luminance $L_X$, we have:

$$t_{nX} = \frac{K_P V_{ref0}}{R_n L_X} \quad (2)$$

$K_P$ being a proportionality coefficient depending on the construction of the pixel, in particular on the quantum yield of the photodiode and on the integration capacitance $C_P$, but also on the optics used.

In FIG. 5:

202 represent the integration curves of pixels 1 and 2 under luminance $L_A$, the integration times being $t_{1A}$ and $t_{2A}$, respectively.

212 represent the integration times of pixels 1 and 2 under luminance $L_B$, the integration times being $t_{1B}$ and $t_{2B}$, respectively.

According to the relationship (2) above, the integrations times $t_{1A}$ and $t_{2A}$ are in a ratio $L_B/L_A$ with the integration times $t_{1A}$ and $t_{2B}$. From a geometrical point of view, there is therefore homothety. If the intention is to quantify the image of an object according to its reflectance, i.e. a quantity which is specific to it, independently of its light illumination, with a quantification accuracy which does not depend on said light illumination, then the quantification steps $Q_i$ have to be adapted in the same homothetic ratio $L_B/L_A$.

Reference 203 corresponds to a quantification step $Q_A$ selected for measuring the integration time when the light illumination has the value $L_A$. Reference 213 corresponds to a quantification step $Q_B$ selected for measuring the integration time when the light illumination has the value $L_B$, with the same quantification accuracy as when the light illumination has the value $L_A$, so that:

$$\frac{Q_B}{Q_A} = \frac{t_{1B}}{t_{1A}} \quad (3)$$

In order to define these quantification steps, a clock which sets the sampling instants $t_i$ has to be generated. In order to satisfy the relationship (3), it is necessary that:

$$t_{i+1} = t_i(1+\alpha) \quad (4)$$

This iteration may also be formulated as an exponential:

$$t_{i+1} = t_0(1+\alpha)^i \quad (5)$$

With such a clock, quantification steps proportional to elapsed time are actually obtained, the value of which is:

$$Q_i = \alpha \cdot t_i \quad (6)$$

The instants $t_i$ are the absolute (real) time instants, at which a new index period i of the clock is defined, the linear incremental value of which is the logarithm of the elapsed time:

$$i = \log_{1+\alpha} t_i = \frac{\log_{10} t_i}{\log_{10}(1+\alpha)} = K_\alpha \log_{10} t_i \quad (7)$$

The values of i are integers which define the successive periods of the clock.

In the case of pixel n under light illumination $L_X$ described by relationship (2), we obtain:

$$i_{nX} = K_n \log_{10} \frac{K_P V_{ref0}}{R_n L_X} = K_a \left( \log_{10} \frac{K_P V_{ref0}}{L_X} - \log_{10} R_n \right) \quad (8)$$

As the time $t_{nX}$ is arbitrary, the result of (8) is real and the integer value of it has to be taken in order to take into account the quantification carried out by the time sampling.

As each time decade takes ten times more time, it is desirable to implement a means for limiting the integration time while converting the maximum of pixels which are found in the blackest areas of the scene, and which have not yet crossed the threshold $V_{ref0}$. For this purpose, it is further possible to convert a light illumination decade rapidly, by reducing the reference voltage $V_{ref}$ 31 in the way described hereafter.

Still in FIG. 5, the curve 220 corresponds to the integration of a pixel which does not receive much light (in the dark). Reference 221 designates the termination period of the integration period, defined from the time $t_{ramp}$ from which the reference voltage $V_{ref}$ 31 begins to decrease right up to the time $t_{end}$ at which the reference voltage only has the value of $V_{ref0}/10$, and which defines the end of the integration period. The termination period was deliberately limited to a decade, after which all the remaining pixels assume the last value corresponding to absolute black. Reference 222 shows the curve of the decrease of the reference voltage $V_{ref}$ 31, the formulation of which will be given hereafter. Reference 223 corresponds to a constant quantification step $Q_t$ (for termination) during the decreasing phase 221 for the time sampling of the events caused during the decrease 222 of the reference voltage $V_{ref}$ 31. Finally reference 224 designates the instant $t_3$ corresponding to the moment of coincidence between the integration voltage 220 of the dark pixel with the curve of the decrease 222 of the reference voltage $V_{ref}$ 31.

At the instant $t_{ramp}$ corresponding to the beginning of the decreasing curve 222, the logarithmic time counter has the value $i=i_{ramp}$. This counter is then incremented with a fixed frequency clock while the reference voltage $V_{ref}$ decreases, so as to achieve sampling identical with what would have been obtained with the prior process.

By admitting that the time of the termination period 221 equal to $t_{end}-t_{ramp}$ is negligible relatively to the last period of the logarithmic clock, then the curve of the decrease 222 of the reference voltage $V_{ref}$ 31 is simply given by:

$$V_{ref} = 10^{-\frac{i-i_{ramp}}{K_a}} V_{ref0} \quad (9)$$

When $i=i_{ramp}$, $V_{ref}=V_{ref0}$. When $i-i_{ramp}=K_a$, i.e. equal to the number of quantification steps of a decade, $V_{ref}=10^{-1}\times V_{ref0}=0.1 \cdot V_{ref0}$. Next, when $t_{end}$ is reached, $V_{ref}$ is suddenly reduced to 0 so as to cause switching of all the remaining pixels, to which the last value of i which corresponds to absolute black is assigned.

How to compute the contrast will now be discussed. Let there be a central pixel C and its left, right, upper and lower neighbors, denoted as G, D, H and B respectively. By taking the differences of the values sampled by the left and right pixels on the one hand, and by the upper and lower pixels on the other hand, said values are computed by means of relationship (8), with the result:

$$\Delta_X = i_G - i_D = K_a (\log_{10} R_D - \log_{10} R_G) = K_a \log_{10}\left(\frac{R_D}{R_G}\right) = C_X \quad (10)$$

$$\Delta_Y = i_B - i_H = K_a (\log_{10} R_H - \log_{10} R_B) = K_a \log_{10}\left(\frac{R_H}{R_B}\right) = C_Y \quad (11)$$

The quantities $C_X$ and $C_Y$ correspond to the logarithm of the ratio of the reflectances, and are a measurement of the contrast independent of the light illumination level. The components of the contrast are therefore obtained by simple subtraction of the two numbers. The computation of these differences may be performed in a massively parallel way by implementing subtractors at the bottom of each column or the matrix. The retained embodiment described in FIG. 4 uses a contrast computing circuit 170 which operates on areas of 3×3 pixels which are sequentially read from the read buffer register 160.

Figure 6:
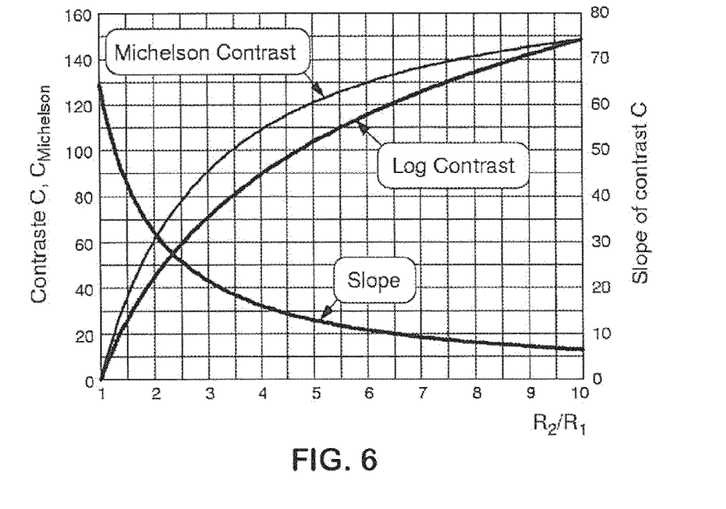
FIG. 6 shows a comparison of the results of the invention with the so-called "Michelson" method for calculating the contrast.

The numerical value of these contrast components $C_x$ and $C_y$ is compared in FIG. 6 with a more conventional definition $C_{Michelson}$ of the contrast measurement given by the following relationship, after normalization of the scales:

$$C_{Michelson} = 2 \frac{R_2 - R_1}{R_2 + R_1} \quad (12)$$

As this may be seen, the calculation of the contrast by subtracting the logarithmic sampling of two reflectances does not qualitatively differ from the conventional contrast measurement described by relationship (12).

It will be noted that in FIG. 6, the curve indicated as "slope" represents the slope either of $C_x$ or $C_y$, and that the curve indicated as "Michelson contrast" has been renormalized so that it may be compared with the curve "Log Contrast".

From a practical point of view, in order to produce the logarithmic time clock from a fixed frequency clock, the simplest method consists of using a table containing in memory all the instants measured relatively to the set frequency clock, at which the logarithmic clock should be incremented, and then generate the pulses by means of a digital comparator. In the example which follows, this represents a memory of 1024 words of 27 bits.

The preferential embodiment proposed within the scope of this invention is based on a state machine which calculates the next instant at which the logarithmic clock counter should be incremented, according to relationship (4). A table may also replace the state machine.

The implementation of such a counter is accomplished with discretized time, $\alpha t_i$ and should be a multiple of the period of the clock signal used.

To facilitate the implementation of the coefficient $\alpha$, it is advantageous if it is a power of 2, i.e.

$$\alpha = 2^{-p} \quad (13)$$

When counting in clock counts, the algorithm then becomes (int means integer part of):

$$T_{i+1} = = T_i + \max[1, (\text{int}(T_i/2^p))] \quad (14)$$

At the first clock count, it is only possible to add a period, which corresponds to $\alpha=1$. At the second clock count, the added period corresponds to 50% of the time having already elapsed and $\alpha=0.5$, and so forth, until the relative resolution of a period becomes smaller than $2^{-p}$. A set frequency counter is therefore obtained during the first $2^{p+1}$ clock counts, gradually becoming logarithmic.

The quantitative example given below is realistic with respect to the present state of the art. The clock frequency is $f_{ck}$=100 MHz and the parameter p=6, which corresponds to a relative time increase of α=1.56%.

Figure 7:
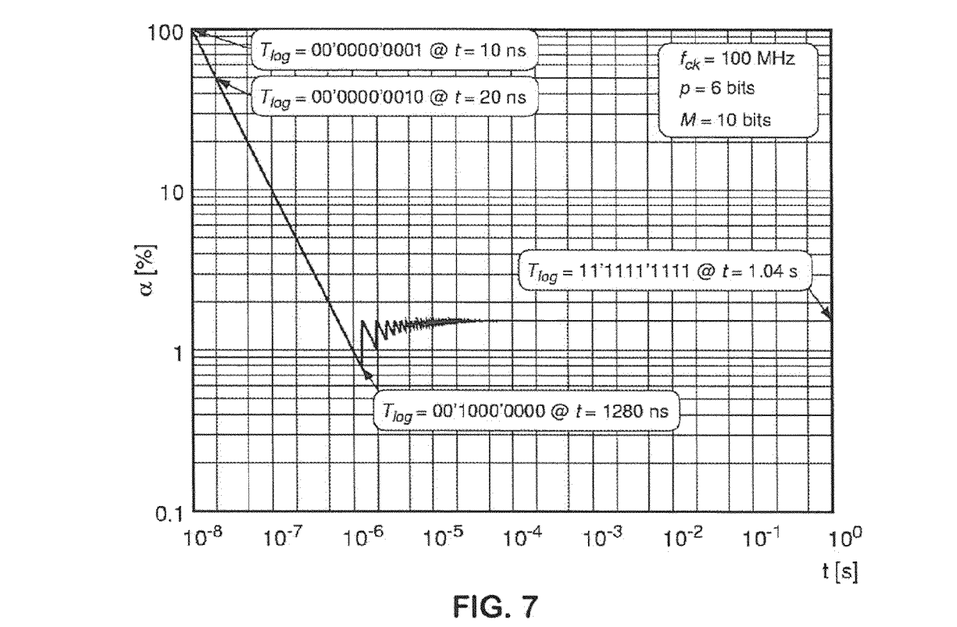
FIG. 7 illustrates an exemplary clock with logarithmic time.

In FIG. 7, the value of α was illustrated versus time. The variable $T_{log}$ represents the value of the logarithmic counter, which corresponds to the index i given by relationship (8), when said counter is reset to zero at the beginning of the integration (time t=0). The resolution per decade is given by the number of iterations k such that $(1+α)^k$=10, i.e.:

$$k = \frac{1}{\log_{10}(1 + \alpha)} = K_\alpha \quad (15)$$

Which, in the case of the selected example, gives a resolution of 149 quantification steps per decade, from the moment that the counter becomes really logarithmic.

In the case when the intention is to only code the logarithmic part of the clock, it is possible to start the counting at zero at the beginning of this area, which allows the use of the whole capacity of the memory word 50 of the pixel. With the value of α of the example, defining 149 quantification steps per decade, 6.8 decades may be covered with a word of only 10 bits.

At the level of the physical embodiment, it is more advantageous as regards the surface area of the circuit, to produce the logarithmic clock by means of a state machine than by using a more conventional method based on the use of a programmed table in memory. A state machine implementing the algorithm described by relationship (14) and using the values of the previous example, is described in relationship with FIG. 8.

Figure 8:
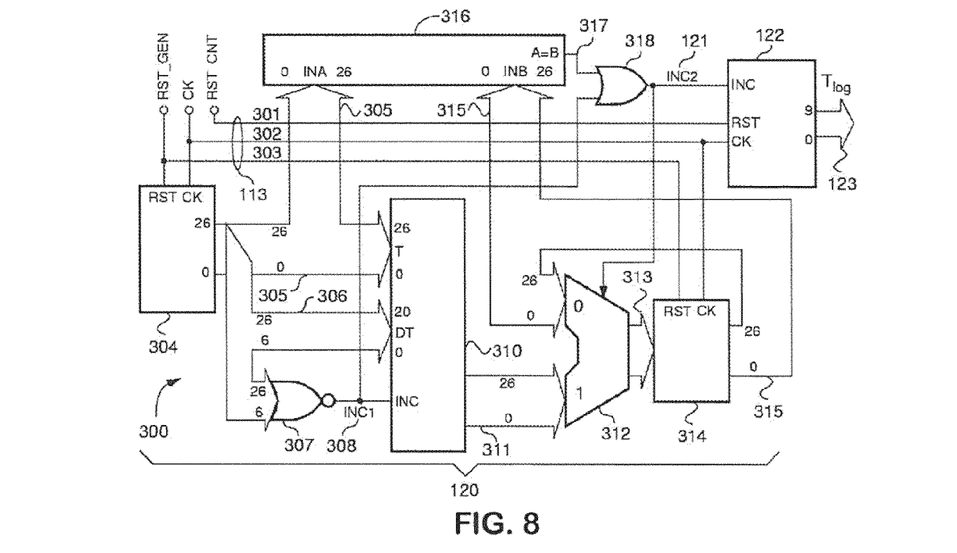
FIG. 8 shows an implementation of the clock with logarithmic time.

The state machine 300 is used for generating the logarithmic time clock. This machine implements blocks 120 and 122 of FIG. 4 wherein:

The signal RST_CNT 301 is the signal for resetting to zero the logarithmic time counter. This signal for resetting to zero may be different from the RST_GEN signal for resetting to zero 303 of the state machine in order to be able to begin the sampling at an arbitrary instant after the beginning of the integration, for example when the clock actually becomes logarithmic.

Reference 302 designates the clock CK with constant frequency $f_{ck}$ for clocking the state machine 300.

Reference 303 designates the RST_GEN signal for resetting to zero the state machine 300. This signal should be released at the same instant 74 (see FIG. 3) as the signal RST 27 of the pixels. This action defines the time origin for the algorithm described by relationship (14) as well as the beginning of the integration of the photo-currents 23.

Reference 113 globally designates the signals 301, 302 and 303 which appear in FIG. 4.

Reference 304 is a 27 bit incremental counter with resetting to zero for counting the linear integration time. This counter is incremented at each clock pulse CK 302.

Reference 305 designates the data bus for transmitting the 27 output bits of the counter 304 towards the comparator 316 and the input T (time) of the adder 310.

Reference 306 designates the data bus for transmitting the 27−6=21 bits of significant weight of the output of the counter 304 towards the input DT (Delta-Time) of the adder 310. These 21 bits of significant weight correspond to the term [integer part of $(T_i/2^p)$] of relationship (13), with p=6.

Reference 307 designates a NOR gate with 21 inputs corresponding to the data of the bus 306. The output INC1 308 of this gate is in the high state as long as the 21 bits of significant weight of the output of the counter 304 are still in the low state.

Reference 308 is the output INC1 of the NOR gate 307. This variable corresponds to the term '1' of the max function of the relationship (13). This signal is forwarded towards the INC input of the adder 310 and one of the inputs of the OR gate 318.

Reference 310 designates an adder with 3 inputs which permanently calculates the future instants $T_{i+1}$ of the next period of the logarithmic counter. The input T corresponds to the term $T_i$ of relationship (13). The two inputs DT and INC correspond to the max function of relationship (13), since as soon as DT becomes greater than zero, the output INC1 308 of the NOR gate 307 switches to the low state (0).

Reference 311 designates the output of the adder 310 which corresponds to the future instant $T_{i+1}$ of the next period of the logarithmic counter.

Reference 312 designates a multiplexer with two 27 bit inputs which is used for transferring the next future instant $T_{i+1}$ into the register 314 at the instant of the pulse INC2 121 which appears at instant $T_i$.

Reference 313 designates the output of the multiplexer 312 applied to the input of the register 314 used for storing in memory the next future instant $T_{i+1}$ and applied to the input INB of the digital comparator 316.

Reference 315 designates the output of the register 314 applied to the input '0' of the multiplexer 312 and to the input INB of the digital comparator 316 allowing detection of the equality between the present time applied to input INA and the future instant $T_{i+1}$ of the next period of the logarithm counter applied to the input INB.

Reference 317 designates the output of the digital comparator 316, in the high state when the inputs INA and INB are equal.

Reference 318 designates the OR gate allowing combination of the signal INC1 308 and of the output A=B of the digital comparator 316 in order to produce the logarithmic time clock signal INC2 121.

Finally, references 121-123 have already been mentioned in connection with FIG. 4.

Figure 9:
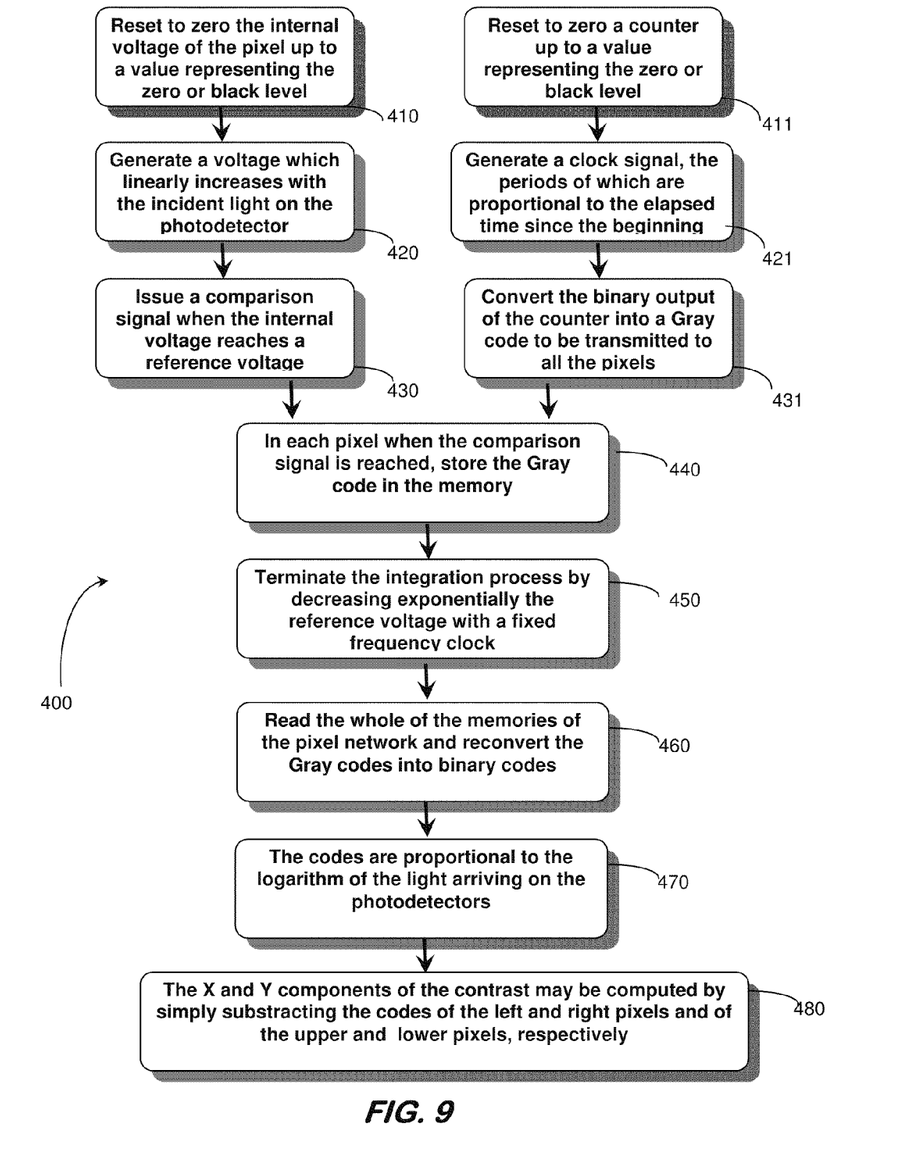
FIG. 9 illustrates the operating procedure of the present invention.

FIG. 9 is a diagram 400 describing the essential phases of the method for measuring the contrast according to the invention.

In 410, the voltage of each pixel of the matrix is reset to zero, representing the zero level or black level. In 420, in each pixel, a voltage is integrated which varies linearly with the incident light on the photodetector. In 430, a comparison signal is emitted when the integrated voltage reaches a reference voltage.

In parallel, in 411, a counter is set to a value which represents a zero level or black level. In 421 a clock signal is produced, the periods of which are proportional to the elapsed time from the beginning of the integration. In 431 a Gray code is provided from the digital output of the counter.

In each pixel, in 440, the Gray code is stored in a memory word on the basis of the comparison signal. The integration process is then finished, in 450, by reducing the reference voltage to a given level and by sampling at a suitable fixed frequency (which may be the base frequency or less); with this termination phase the conversion time of the last luminance decade may be reduced. In 460, reading of the memories of the matrix as well as the conversion of the Gray codes into binary codes are carried out; this operation is performed for example line by line. In 470, the digital codes are proportional (see relationships (7) and (8)) to the logarithm of the incident light on the photodetectors. Finally, in 480, the X and Y components of the contrast may be calculated by simple subtraction of the left and right pixels, and of the upper and lower pixels, respectively.

In order to calculate the contrast between two objects of the scene, the images of which are spaced out by more than one pixel, it is possible to take the sum (or the average value) of the area of the image representing the first object, and to subtract it from the sum of the area of the image where the second object is located. Care would have been taken in order to take areas including the same number of pixels for carrying out the subtraction. With this method, it is possible to easily calculate the contrast at different spatial scales.

Although the present invention has been described within the scope of a particular application, such as the calculation of the contrasts of a scene, it is clear that modifications or alternatives thereof are possible without however departing from the scope thereof.

The invention claimed is:

1. A digital vision sensor which comprises an array of pixels each having a photodetector and adapted to receive a light beam representing a visual scene, comprising:
   a reference voltage $V_{ref}$ generator;
   in each pixel, means for generating during an integration phase, a voltage $V_P$ proportional to illumination received by the pixel;
   in each pixel, a comparator for determining the instant at which the voltage $V_P$ of said pixel reaches the voltage $V_{ref}$, common to all the pixels;
   a clock generator generating a clock;
   a device for counting a number of periods of the clock having elapsed since the beginning of the integration phase, delivering a result as a binary code;
   one RAM static memory word per pixel;
   in each pixel, means for allowing said binary code present at said instant to be written into said memory;
   means for controlling a termination of the integration phase;
   means for reading information stored in the memory; and
   means for computing the contrast from binary values stored in memory,
   wherein the period of said clock proportionally increases with the elapsed time from the beginning of the integration phase, and wherein a termination phase for ending the integration phase preceding resetting to zero of the pixels, is carried out with a fixed frequency clock while the reference voltage $V_{ref}$ satisfies a relationship:

$$V_{ref} = 10^{-\frac{i\_i_{ramp}}{K_a}} V_{ref0}.$$

2. The vision sensor according to claim 1, wherein the vision sensor further comprises a device allowing said binary code to be encoded into a Gray code and in that said reading means carry out the decoding of said Gray codes into their original binary values.

3. The vision sensor according to claim 2, wherein the vision sensor includes means for computing contrast from binary values stored in memory.

4. The vision sensor according to claim 1, wherein said contrast comprises X and Y components computed by subtraction of the binary values stored in left and right, upper and lower neighbors of said pixels respectively.

5. The vision sensor according to claim 4, wherein said X and Y components of said contrast are calculated by subtracting binary values stored in diagonal neighboring pixels positioned on both diagonals of said pixels, respectively.

6. A method for measuring local contrast specific to a scene, which does not depend on light illumination of said scene, by means of a vision sensor which comprises an array of pixels each having a photodetector, comprising:
   determining a time required for allowing a voltage $V_P$ resulting from the integration of the current from the photodetector of each pixel to reach a reference voltage $V_{ref}$ common to all the pixels;
   generating a clock signal, time intervals of which between two successive time values being proportional to the time elapsed from the beginning of the integration, and counting the time by means of said clock signal, a binary code resulting from said counting being proportional to a logarithm of the elapsed time from the beginning of the integration;
   generating a Gray code from the binary digital code representing said time values;
   storing the Gray code in pixel memory when the voltage of the pixel reaches the reference voltage;
   upon reading the memories of the pixels, converting the Gray codes stored in said memory into binary digital quantities;
   calculating X and Y components of said local contrast of the scene; and
   carrying out a termination phase of said integration preceding resetting to zero of the pixels with a fixed frequency clock while the reference voltage Vref satisfies a relationship:

$$V_{ref} = 10^{-\frac{i\_i_{ramp}}{K_a}} V_{ref0}.$$

7. The method according to claim 6, wherein the X and Y components of said contrast are calculated by the difference of the binary codes of the left and right neighbors, of the upper and lower neighbors of each of the pixels respectively.

8. The method according to claim 6, wherein said X and Y components of said contrast are calculated by the difference of the binary codes of the neighbors respectively positioned on both diagonals of each of the pixels.

* * * * *